(12) United States Patent
Kamimura et al.

(10) Patent No.: US 10,889,329 B2
(45) Date of Patent: Jan. 12, 2021

(54) VEHICLE SIDE PORTION STRUCTURE

(71) Applicant: TOYOTA JIDOSHA KABUSHIKI KAISHA, Toyota (JP)

(72) Inventors: Shinya Kamimura, Toyota (JP); Koki Ikeda, Toyota (JP); Shunsuke Kanagai, Anjo (JP); Tomoki Matsumura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 16/267,852

(22) Filed: Feb. 5, 2019

(65) Prior Publication Data
US 2019/0256154 A1 Aug. 22, 2019

(30) Foreign Application Priority Data

Feb. 20, 2018 (JP) .................. 2018-028171

(51) Int. Cl.
*B62D 25/04* (2006.01)
*B60R 13/04* (2006.01)
*B62D 25/06* (2006.01)
*B60J 10/84* (2016.01)

(52) U.S. Cl.
CPC .............. *B62D 25/04* (2013.01); *B60R 13/04* (2013.01); *B62D 25/06* (2013.01); *B60J 10/84* (2016.02)

(58) Field of Classification Search
CPC ........ B62D 25/04; B62D 25/06; B60R 13/04; B60J 10/84
See application file for complete search history.

(56) References Cited

U.S. PATENT DOCUMENTS

| 3,580,628 | A | * | 5/1971 | Rantala | B60R 13/04 |
| | | | | | 296/209 |
| 4,984,842 | A | * | 1/1991 | Ogawa | B60J 5/06 |
| | | | | | 296/155 |
| 6,217,109 | B1 | * | 4/2001 | Okana | B62D 25/025 |
| | | | | | 296/187.12 |

(Continued)

FOREIGN PATENT DOCUMENTS

| AL | 0126895 A1 | 12/1984 |
| EP | 1325827 A1 | 7/2003 |

(Continued)

OTHER PUBLICATIONS

U.S. Appl. No. 16/034,956, filed Jul. 13, 2018 in the name of Takii et al.

(Continued)

*Primary Examiner* — Lori L Lyjak
(74) *Attorney, Agent, or Firm* — Oliff PLC

(57) ABSTRACT

A vehicle side portion structure includes a roof side rail that includes a rail reinforcement that is an outer portion of the roof side rail in a width direction of a vehicle, the roof side rail having a closed cross-section structure, a first upper contact surface which is formed on the rail reinforcement and with which a weather strip provided on an outer peripheral portion of a front side door is to come into contact, a flange which is formed at the rail reinforcement and to which a roof panel is joined, and a rail garnish that covers a portion of the roof side rail from the flange to an upper portion of the first upper contact surface in an up-down direction of the vehicle.

8 Claims, 10 Drawing Sheets

(56) References Cited

U.S. PATENT DOCUMENTS

| | | | |
|---|---|---|---|
| 6,276,109 B1* | 8/2001 | Hingorani | B60R 13/04 |
| | | | 52/716.1 |
| 2003/0132646 A1 | 7/2003 | Hoshina | |
| 2005/0040670 A1* | 2/2005 | Kikuchi | B60P 7/0815 |
| | | | 296/183.1 |
| 2014/0319877 A1 | 10/2014 | Hida | |
| 2018/0222296 A1* | 8/2018 | Hattori | B60J 7/043 |
| 2019/0031242 A1* | 1/2019 | Takii | B62D 25/04 |
| 2020/0001935 A1* | 1/2020 | Nielsen | B62D 35/007 |

FOREIGN PATENT DOCUMENTS

| | | |
|---|---|---|
| EP | 2783949 A1 | 10/2014 |
| JP | S59-006116 A | 1/1984 |
| JP | 2001-334957 A | 12/2001 |
| JP | 2003-205733 A | 7/2003 |
| JP | 2011-195108 A | 10/2011 |
| JP | 5764667 B2 | 8/2015 |
| KR | 1998-040376 U | 9/1998 |
| KR | 1998-050886 U | 10/1998 |

OTHER PUBLICATIONS

Aug. 21, 2019 Extended Search Report issued in European Patent Application No. 19157361.7.

\* cited by examiner

VEHICLE SIDE PORTION STRUCTURE

INCORPORATION BY REFERENCE

The disclosure of Japanese Patent Application No. 2018-028171 filed on Feb. 20, 2018 including the specification, drawings and abstract is incorporated herein by reference in its entirety.

BACKGROUND

1. Technical Field

The present disclosure relates to a vehicle side portion structure.

2. Description of Related Art

Japanese Patent Application Publication No. 2011-195108 discloses a vehicle side portion structure including a side panel outer that is a side member outer panel covering a side portion of a vehicle body from the outside. A roof side rail portion and a rear panel portion of the side member outer panel of the vehicle side portion structure are made of the same material and are formed integrally with each other.

SUMMARY

Incidentally, the side member outer panel of the vehicle side portion structure has a shape where the roof side rail portion extends toward the front side of a vehicle from an upper portion of the rear panel portion in the up-down direction of the vehicle in a side view of the vehicle. For this reason, since much scrap is generated in this structure when a blank for the side member outer panel is punched out of a steel plate, a yield is low. Further, there is a possibility that a thin roof side rail portion may be damaged when the side member outer panel is transported or is handled during assembly.

The disclosure provides a vehicle side portion structure that allows a vehicle body to be light and allows a yield to be improved by a reduction in the size of a side member outer panel.

A vehicle side portion structure of a first aspect of the disclosure includes a roof side rail that includes a rail reinforcement that is an outer portion of the roof side rail in a width direction of a vehicle and has a closed cross-section structure, a first contact surface which is formed on the rail reinforcement and with which a weather strip provided on an outer peripheral portion of a side door is to come into contact, a flange which is formed at the rail reinforcement and to which a roof panel is joined, and a rail garnish that covers a portion of the roof side rail from the flange to an upper portion of the first contact surface in an up-down direction of the vehicle.

According to the vehicle side portion structure of the first aspect, the outer portion of the roof side rail, which has a closed cross-section, in the width direction of the vehicle is formed by the rail reinforcement. The rail reinforcement includes the first contact surface with which the weather strip provided on the outer peripheral portion of the side door is to come into contact. Further, a portion of the roof side rail from the flange, to which the roof panel is joined, to an upper portion of the first contact surface in the up-down direction of the vehicle is covered with the rail garnish. That is, the first contact surface, which is provided so as to face the side door, of the rail reinforcement of the vehicle side portion structure is exposed to the outside and is not covered with the side member outer panel or the like. Accordingly, the rail reinforcement functions as a quasi-outer plate when the side door is opened. Here, "quasi-outer plate" means an outer plate that is exposed to the outside of the vehicle when a front side door and a rear side door are opened.

Further, the rail garnish covering the roof side rail is a member that is separate from the rail reinforcement. For this reason, according to the vehicle side portion structure of the first aspect, the number of members used to cover a vehicle side portion is smaller than that in a case where the vehicle side portion includes the roof side rail and the side member outer panel covering a vehicle rear side portion. Accordingly, the vehicle can be made light. Further, since the side member outer panel covering a portion from the vehicle rear side portion to the roof side rail is not provided and the side member outer panel covering only the vehicle rear portion is provided, the generation amount of scrap at the time when a blank for the side member outer panel is punched out of a steel plate, is reduced. Accordingly, a yield can be improved.

The vehicle side portion structure of the first aspect of the disclosure may further include a pillar reinforcement, which forms an outer portion of a pillar in the width direction of the vehicle and is joined to the rail reinforcement in a state where the pillar reinforcement is overlapped with the rail reinforcement, and the pillar reinforcement may include a second contact surface with which the weather strip is to come into contact.

According to the above vehicle side portion structure, the second contact surface, which is provided so as to face at least the side door, of the pillar reinforcement is exposed to the outside and is not covered with the side member outer panel or the like. Accordingly, the pillar reinforcement functions as a quasi-outer plate when the side door is opened. Further, since the side member outer panel covering the pillar is not provided, the area of a hollow portion of the closed cross-section formed by the pillar reinforcement can be increased as much as that. That is, the cross-sectional strength and stiffness of the pillar can be improved, and the thickness of the pillar reinforcement or the like of the pillar is reduced, so that the vehicle can be made light.

In the above vehicle side portion structure, a connecting portion between the pillar reinforcement and the rail reinforcement may include a parting portion that is an outer portion of the connecting portion in the width direction of the vehicle, and the parting portion may be filled with a filler such that a surface continuing over the rail reinforcement from the pillar reinforcement is formed.

According to the above vehicle side portion structure, a step, which is formed at the parting portion of the rail reinforcement and the pillar reinforcement functioning as a quasi-outer plate, may be filled with the filler, so that the infiltration of rain water or the like into the parting portion can be suppressed.

In the above vehicle side portion structure, a connecting portion between the pillar reinforcement and the rail reinforcement may include a parting portion that is an outer portion of the connecting portion in the width direction of the vehicle, and the parting portion may be provided with a cover member such that a surface continuing over the rail reinforcement from the pillar reinforcement is formed.

According to the above vehicle side portion structure, a step, which is formed at the parting portion of the rail reinforcement and the pillar reinforcement functioning as a quasi-outer plate, is covered with a cover member, such that the infiltration of rain water or the like into the parting portion can be suppressed.

In the above vehicle side portion structure, a connecting portion of a front pillar between the pillar reinforcement and the rail reinforcement may include a front parting portion that is an outer portion of the connecting portion in the width direction of the vehicle, and the front parting portion may be provided so as to be exposed to an outside of a front fender.

According to the above vehicle side portion structure, the front parting portion, which is formed at the connecting portion of the front pillar between the pillar reinforcement and the rail reinforcement, is not hidden by the front fender. For this reason, a seal material can be applied to the front parting portion even after the front fender is mounted on a vehicle body frame.

In the vehicle side portion structure of the first aspect, the rail garnish may be made of a resin.

According to the above vehicle side portion structure, the roof side rail portion can be made light. Further, only the roof side rail portion can be set to a shape and a color having high designability. In addition, since the rail garnish made of a resin can be attached and detached using a clip or the like, the rail garnish can be easily replaced.

In the vehicle side portion structure of the first aspect, the roof side rail may include a protruding portion that protrudes outward from the first contact surface in the width direction of the vehicle.

According to the above vehicle side portion structure, since the protruding portion is disposed at a position most distant from a neutral axis of bending moment at the time of lateral collision of the vehicle, yield strength can be efficiently improved.

In the above vehicle side portion structure, a lower end portion of the rail garnish in the up-down direction of the vehicle may be provided with an elastic member that is in contact with the protruding portion and the first contact surface.

According to the above vehicle side portion structure, since the elastic member is in contact with the roof side rail at a plurality of portions while being subjected to an elastic force, the position variation of the lower end portion of the rail garnish in the up-down direction of the vehicle is suppressed.

According to the aspects of the disclosure, it is possible to allow a vehicle body to be light and to allow a yield to be improved by a reduction in the size of a side member outer panel.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle side portion structure 10 according to an embodiment of the disclosure will be described below with reference to the drawings. In the respective drawings, an arrow FR indicates the front side of a vehicle, an arrow UP indicates the upper side of the vehicle, and an arrow OUT indicates the outside in a width direction of the vehicle. Further, since a front portion of the vehicle has a basically right-left symmetrical structure, a left portion of the vehicle when viewed from an occupant being seated will be illustrated and described.

(Basic Structure of Vehicle Side Portion Structure)

Figure 1:
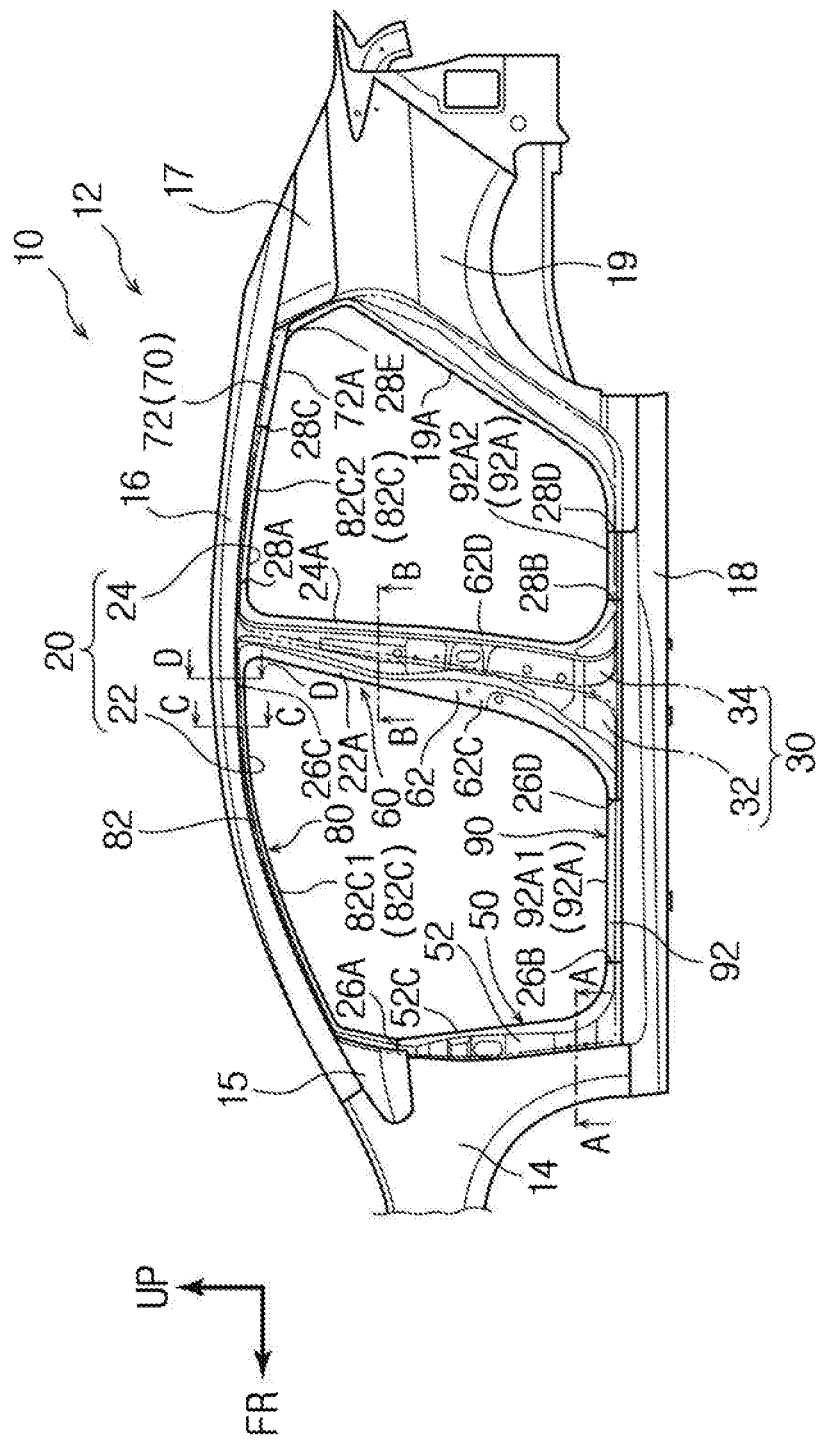
FIG. 1 is a left side view of a vehicle illustrating a vehicle side portion structure according to an embodiment.
Figure 2:
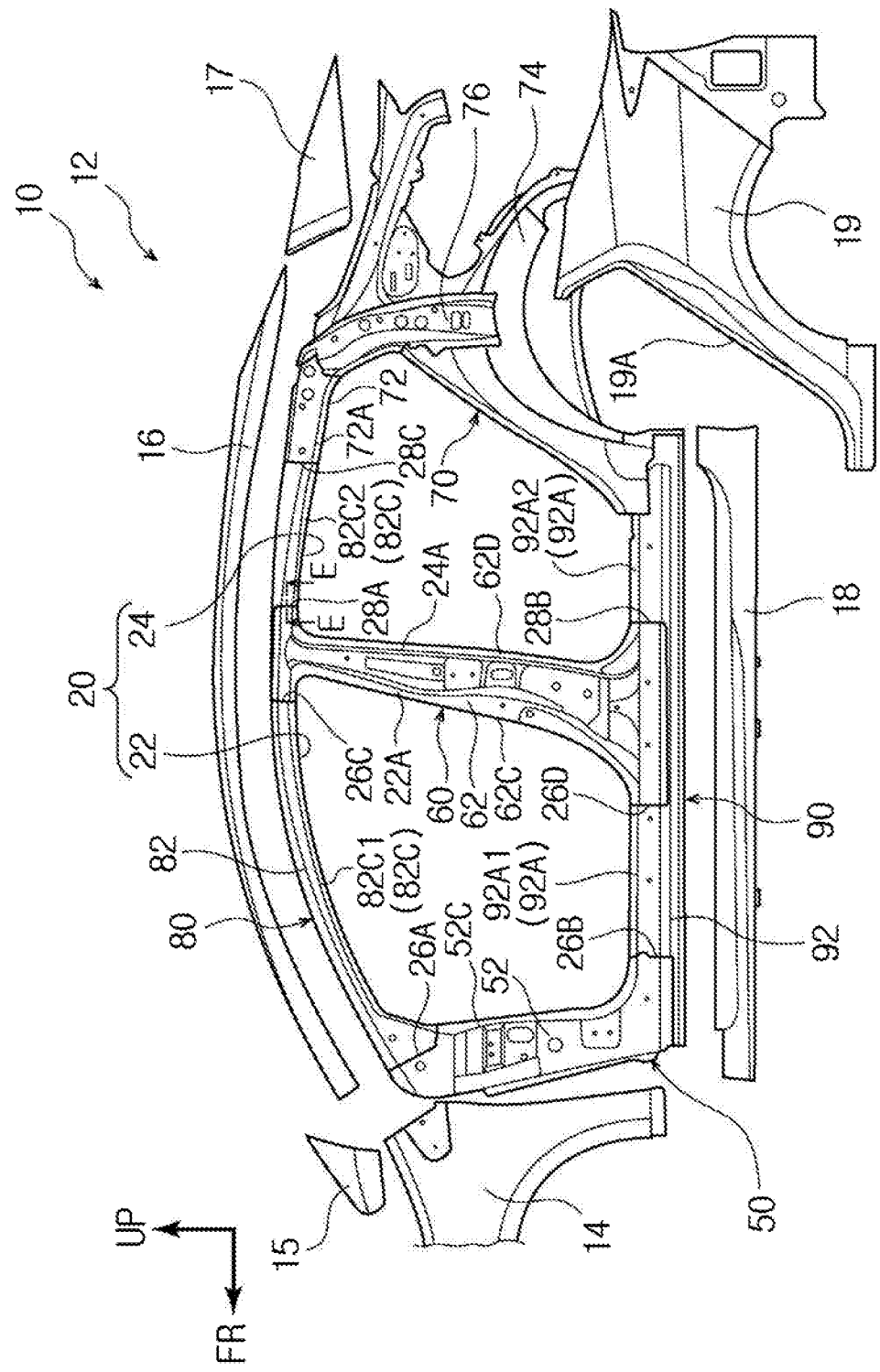
FIG. 2 is an exploded view (left side view) of the respective members that are not yet joined to vehicle frames of the vehicle side portion structure according to the embodiment.

As illustrated in FIGS. 1 and 2, a rocker 90 is provided at a lower portion of an outer portion of a vehicle (vehicle body) 12, to which the vehicle side portion structure 10 according to this embodiment is applied, in the width direction of the vehicle and extends in a front-rear direction of the vehicle. A front pillar 50 extends toward the upper side of the vehicle from a front end portion of the rocker 90. Further, a center pillar 60 extends toward the upper side of the vehicle from a middle portion of the rocker 90 in the front-rear direction of the vehicle. Furthermore, a rear pillar 70 extends toward the upper side of the vehicle from a rear end of the rocker 90. A roof side rail 80, which extends in the front-rear direction of the vehicle, is joined to an upper end portion of the front pillar 50, an upper end portion of the center pillar 60, and an upper end portion of the rear pillar 70. The rocker 90, the front pillar 50, the center pillar 60, the rear pillar 70, and the roof side rail 80 are formed as vehicle frames that are made of metal and have a closed cross-section.

Here, a front side door opening portion 22, which has a substantially rectangular opening in a side view when viewed in the width direction of the vehicle, is formed by the rocker 90, the front pillar 50, the roof side rail 80, and the center pillar 60. Further, a rear side door opening portion 24, which has a substantially rectangular opening in a side view when viewed in the width direction of the vehicle, is formed by the rocker 90, the center pillar 60, the roof side rail 80, and the rear pillar 70. Each of the front side door opening portion 22 and the rear side door opening portion 24 is an example of a door opening portion 20.

Further, a side door 30 is provided on each door opening portion 20 so as to be openable and closable. Specifically, a front side door 32 is provided on the front side door opening portion 22 so as to be openable and closable, and a rear side door 34 is provided on the rear side door opening portion 24 so as to be openable and closable. The corresponding side door 30 is closed on each door opening portion 20, so that the inside 110 of the vehicle and the outside 112 of the vehicle (see FIGS. 4 to 7) are partitioned. Meanwhile, as illustrated in FIGS. 4 to 7, a weather strip 42 made of rubber is provided on the front side door 32 so as to surround the outer peripheral portion of the front side door 32. Further, a door opening trim 58 made of rubber is provided on the front side door opening portion 22 along the inner edge portion of the front side door opening portion 22. Meanwhile, as illustrated in FIG. 5, a weather strip 44 made of rubber is provided on the rear side door 34 so as to surround the outer peripheral portion of the rear side door 34. Further, a door opening trim 78 made of rubber is provided on the rear side door opening portion 24 along the inner edge portion of the rear side door opening portion 24.

As illustrated in FIG. 2, a front pillar reinforcement 52 (hereinafter, referred to as "front pillar RF 52"), which forms the outer portion of the front pillar 50 in the width direction of the vehicle, is joined to each of the outer surfaces of the roof side rail 80 and the rocker 90 in the width direction of the vehicle. In detail, an upper portion of the front pillar RF 52 in an up-down direction of the vehicle is joined to a rail reinforcement 82 (hereinafter, referred to as "rail RF 82"), which forms the outer portion of the roof side rail 80 in the width direction of the vehicle, by welding or the like. Further, a lower portion of the front pillar RF 52 in the up-down direction of the vehicle is joined to a rocker reinforcement 92 (hereinafter, referred to as "rocker RF 92"), which forms the outer portion of the rocker 90 in the width direction of the vehicle, by welding or the like.

Further, a center pillar reinforcement 62 (hereinafter, referred to as "center pillar RF 62"), which forms the outer portion of the center pillar 60 of this embodiment in the width direction of the vehicle, is joined to each of the outer surfaces of the roof side rail 80 and the rocker 90 in the width direction of the vehicle. In detail, an upper portion of the center pillar RF 62 in the up-down direction of the vehicle is joined to the rail RF 82, which forms the outer portion of the roof side rail 80 in the width direction of the vehicle, by welding or the like. Further, a lower portion of the center pillar RF 62 in the up-down direction of the vehicle is joined to the rocker RF 92, which forms the outer portion of the rocker 90 in the width direction of the vehicle, by welding or the like.

In addition, a rear pillar reinforcement 72 (hereinafter, referred to as "rear pillar RF 72"), which forms the outer portion of the rear pillar 70 of this embodiment in the width direction of the vehicle, is joined to each of the outer surfaces of the roof side rail 80 and the rocker 90 in the width direction of the vehicle. In detail, an upper portion of the rear pillar RF 72 in the up-down direction of the vehicle is joined to the rail RF 82, which forms the outer portion of the roof side rail 80 in the width direction of the vehicle, by welding or the like. Further, a lower portion of the rear pillar RF 72 in the up-down direction of the vehicle is joined to the rocker RF 92, which forms the outer portion of the rocker 90 in the width direction of the vehicle, by welding or the like.

As illustrated in FIGS. 1 and 2, a rail garnish 16 is an exterior member that covers the roof side rail 80. The rail garnish 16 is a panel that is molded independently of the roof side rail 80 and is made of a resin.

A rocker molding 18 is an exterior member that covers the rocker 90. The rocker molding 18 is a panel that is molded independently of the rocker 90 and is made of a resin.

A quarter panel 19 is a member that covers the outer portion of a rear portion of the vehicle, which includes the rear pillar 70, in the width direction of the vehicle. In detail, the quarter panel 19 is a side member outer panel that covers the rear pillar 70, a wheel house outer panel 74, a reinforcing member 76, and the like forming the rear portion of the vehicle, extends in the front-rear direction of the vehicle, and is made of metal (iron) (see FIG. 2).

A boundary portion between the lower edge portion of the rail garnish 16 and a front fender 14 on the front side of the rail garnish 16 in the front-rear direction of the vehicle is covered with a pillar garnish 15. The pillar garnish 15 is a panel that is molded independently of the rail garnish 16 and the front fender 14 and is made of a resin.

Further, a boundary portion between the lower edge portion of the rail garnish 16 and the quarter panel 19 on the rear side of the rail garnish 16 in the front-rear direction of the vehicle is covered with a quarter garnish 17. The quarter garnish 17 is a panel that is molded independently of the rail garnish 16 and the quarter panel 19 and is made of a resin.

Here, an opening peripheral edge portion, which faces the front side door 32, of the front side door opening portion 22 is in the following state. That is, the rail RF 82, the front pillar RF 52, the rocker RF 92, and the center pillar RF 62 of the front side door opening portion 22 are exposed to the outside, and are not covered with one panel, such as the side member outer panel. For this reason, a parting portion 26A is present at a joint between the front pillar RF 52 and the rail RF 82, and a parting portion 26B is present at a joint between the front pillar RF 52 and the rocker RF 92. Further, a parting portion 26C is present at a joint between the center pillar RF 62 and the rail RF 82, and a parting portion 26D is present at a joint between the center pillar RF 62 and the rocker RF 92.

Meanwhile, the parting portions 26A and 26C, which are present close to the roof side rail 80, among the parting portions 26A, 26B, 26C, and 26D present on the front side door opening portion 22 are filled with a seal material 150 that is a filler. Accordingly, a contact surface 22A, which is a continuous surface without a step and with which the weather strip 42 is to come into contact, is formed on the front side door opening portion 22. The contact surface 22A includes a front contact surface 52C that is provided on the front pillar RF 52, and a first upper contact surface 82C1, which is closer to the front side of the vehicle than the center pillar RF 62, of an upper contact surface 82C provided on the rail RF 82. Further, the contact surface 22A includes a first intermediate contact surface 62C that is provided on the front side of the center pillar RF 62 in the front-rear direction of the vehicle, and a first lower contact surface 92A1, which is closer to the front side of the vehicle than the center pillar RF 62, of a lower contact surface 92A provided on the rocker RF 92. Here, the first upper contact surface 82C1 (upper contact surface 82C) corresponds to a first contact surface, and the front contact surface 52C and the first intermediate contact surface 62C correspond to a second contact surface.

Figure 3:
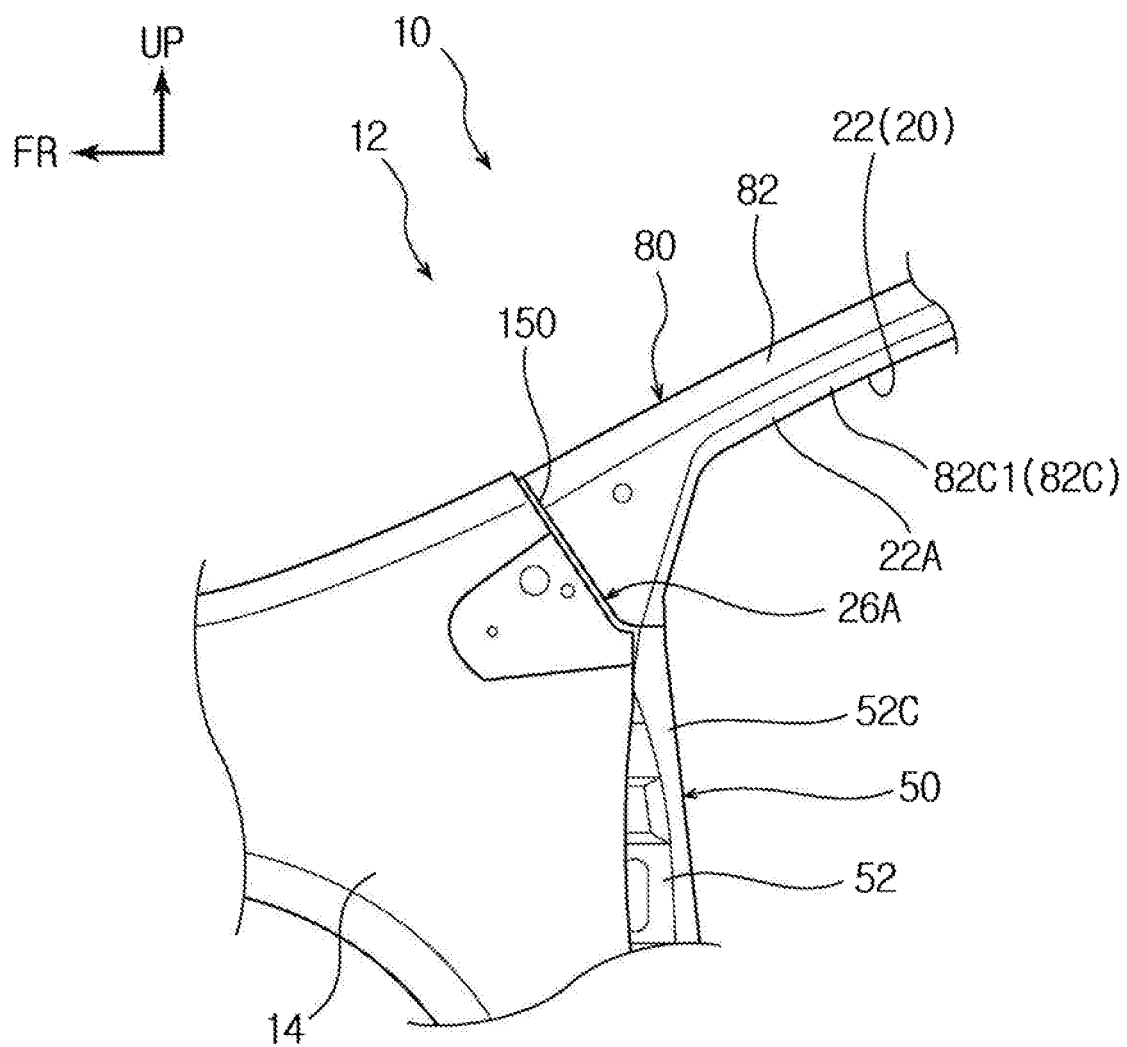
FIG. 3 is an enlarged view of a portion of the vehicle side portion structure according to the embodiment around a parting portion between a front pillar reinforcement and a rail reinforcement.

As illustrated in FIG. 3, the parting portion 26A between the front pillar RF 52 and the rail RF 82 is exposed to the outside without being hidden by the front fender 14 in a case where the front fender 14 is mounted on the vehicle body 12. The parting portion 26A corresponds to a front parting portion.

Meanwhile, as illustrated in FIGS. 1 and 2, an opening peripheral edge portion, which faces the rear side door 34, of the rear side door opening portion 24 is in the following state. That is, the rail RF 82, the center pillar RF 62, the rocker RF 92, the rear pillar RF 72, and a part of the quarter panel 19 of the rear side door opening portion 24 are exposed to the outside, and are not covered with one panel, such as the side member outer panel. For this reason, a parting portion 28A is present at a joint between the center pillar RF 62 and the rail RF 82, and a parting portion 28B is present at a joint between the center pillar RF 62 and the rocker RF 92. Further, a parting portion 28C is present at a joint between the rear pillar RF 72 and the rail RF 82, and a parting portion 28D is present at a joint between the quarter panel 19 and the rocker RF 92. Furthermore, a parting portion 28E is present at a joint between the rear pillar RF 72 and the quarter panel 19.

Figure 9:
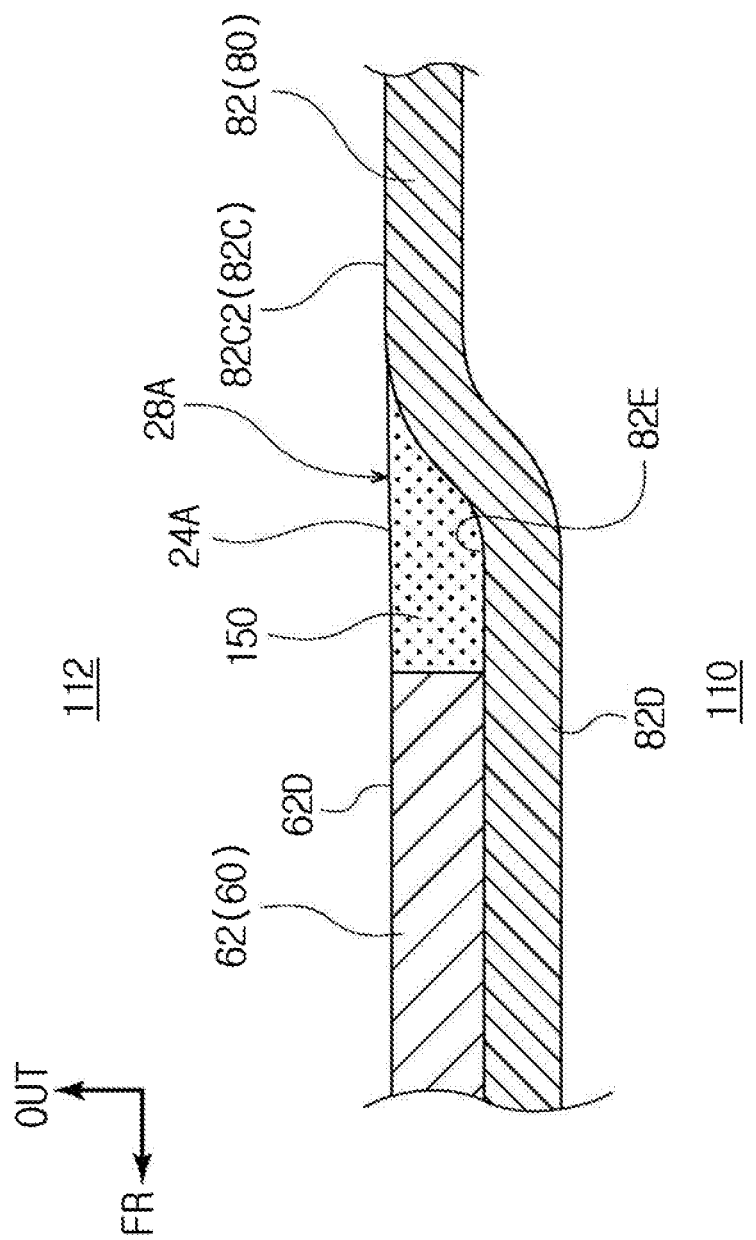
FIG. 9 is a cross-sectional view of the parting portion of the vehicle side portion structure according to the embodiment (a cross-sectional view taken along line E-E of FIG. 2)

Meanwhile, the parting portions 28A, 28C, and 28E, which are present close to the roof side rail 80, among the parting portions 28A, 28B, 28C, 28D, and 28E present on the rear side door opening portion 24 are filled with the seal material 150 that is a filler (see FIG. 9). Accordingly, a contact surface 24A, which is a continuous surface without a step and with which the weather strip 44 is to come into contact, is formed on the rear side door opening portion 24. The contact surface 24A includes a second intermediate contact surface 62D that is provided on the rear side of the center pillar RF 62 in the front-rear direction of the vehicle, and a second upper contact surface 82C2, which is closer to the rear side of the vehicle than the center pillar RF 62, of the upper contact surface 82C provided on the rail RF 82. Further, the contact surface 24A includes an upper rear contact surface 72A that is provided on the rear pillar RF 72 and a rear contact surface 19A that is provided on the quarter panel 19. Furthermore, the contact surface 24A includes a second lower contact surface 92A2, which is closer to the rear side of the vehicle than the center pillar RF 62, of the lower contact surface 92A provided on the rocker RF 92. Here, the second upper contact surface 82C2 (upper contact surface 82C) corresponds to the first contact surface, and the second intermediate contact surface 62D correspond to the second contact surface.

(Cross-Sectional Structure of Vehicle Side Portion Structure)

Next, the cross-sectional structure of the vehicle side portion structure 10 of this embodiment will be described.

(Front Pillar)

Figure 4:
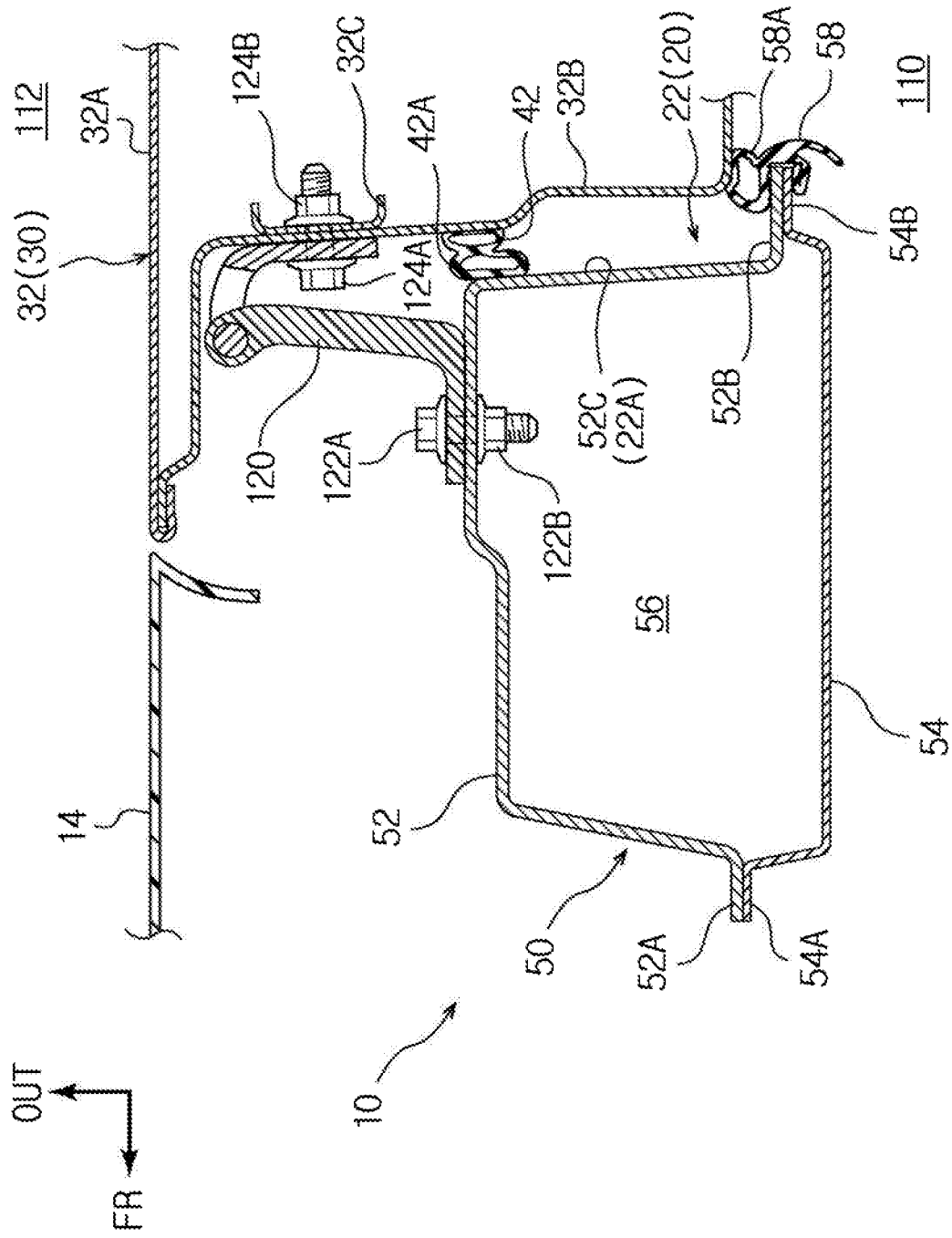
FIG. 4 is a cross-sectional view of a portion of the vehicle side portion structure according to the embodiment around a front pillar (a cross-sectional view taken along line A-A of FIG. 1)
Figure 5:
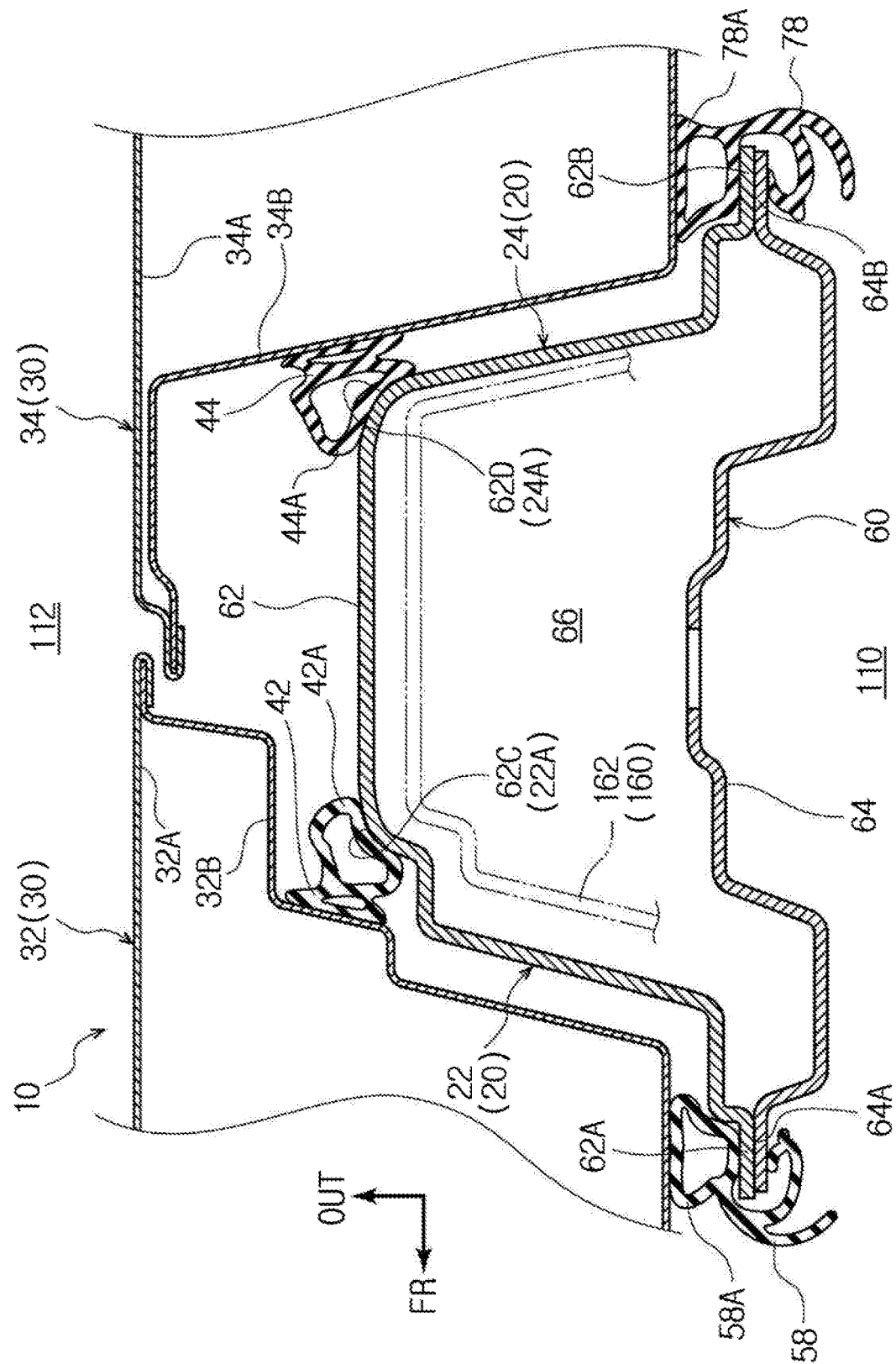
FIG. 5 is a cross-sectional view of a portion of the vehicle side portion structure according to the embodiment around a center pillar (a cross-sectional view taken along line B-B of FIG. 1)

FIG. 4 is a cross-sectional view of a portion around the front pillar 50 (a cross-sectional view taken along line A-A of FIG. 1). As illustrated in FIG. 4, the front pillar 50 includes the front pillar RF 52 that is an outer portion of the front pillar 50 in the width direction of the vehicle and a front pillar inner panel 54 that is an inner portion of the front pillar 50 in the width direction of the vehicle. The front pillar RF 52 has the shape of a hat that is opened inward in the width direction of the vehicle in a plan cross-sectional view, a flange 52A, which extends toward the front side of the vehicle, is formed at the front portion of the front pillar RF 52 in the front-rear direction of the vehicle, and a flange 52B, which extends toward the rear side of the vehicle, is formed at the rear portion of the front pillar RF 52 in the front-rear direction of the vehicle. Further, the front pillar inner panel 54 has the shape of a hat that is opened outward in the width direction of the vehicle in a plan cross-sectional view, a flange 54A, which extends toward the front side of the vehicle, is formed at the front portion of the front pillar inner panel 54 in the front-rear direction of the vehicle, and a flange 52B, which extends toward the rear side of the vehicle, is formed at the rear portion of the front pillar inner panel 54 in the front-rear direction of the vehicle. Furthermore, the flange 52A and the flange 54A are joined to each other by spot welding or the like, and the flange 52B and the flange 54B are joined to each other by spot welding or the like. Accordingly, the front pillar RF 52 and the front pillar inner panel 54 are joined to each other and the front pillar 50 having a closed cross-section 56 is formed.

The front pillar RF 52 of this embodiment forms the outermost surface of the front pillar 50 in the width direction of the vehicle. That is, the front pillar RF 52 is formed as a quasi-outer plate that is exposed to the outside 112 of the vehicle when the front side door 32 is opened.

The weather strip 42 is provided on a door inner panel 32B of the front side door 32 so as to surround the outer peripheral portion of the front side door 32. The weather strip 42 includes a hollow seal portion 42A that is bulged toward the front side door opening portion 22 and has a hollow cross-section. The hollow seal portion 42A is in contact with the front contact surface 52C, which forms the contact surface 22A, in a state where the hollow seal portion 42A is elastically deformed. The door opening trim 58 is provided on the flanges 52B and 54B that are the rear end portion of the front pillar 50 in the front-rear direction of the vehicle. The door opening trim 58 includes a hollow seal portion 58A that is bulged outward in the width direction of the vehicle and has a hollow cross-section. The hollow seal portion 58A is in contact with the door inner panel 32B to be described later in a state where the hollow seal portion 58A is elastically deformed.

The front side door 32 is supported on the outer surface of the front pillar RF 52 in the width direction of the vehicle through a door hinge 120 so as to be openable and closable. The front side door 32 includes a door outer panel 32A that is made of metal and substantially has the shape of a flat plate in a plan cross-sectional view, and the door inner panel 32B that is made of metal and substantially has the shape of a hat. Further, in the front side door 32 of this embodiment, a reveal 32D, which supports a side door glass 36 so as to allow the side door glass 36 to be slidable, is joined to an upper portion of the door inner panel 32B in the up-down direction of the vehicle (see FIG. 6).

Meanwhile, the front fender 14, which extends in the front-rear direction of the vehicle and is made of metal, is provided on the front side of the door outer panel 32A in the front-rear direction of the vehicle. A continuous design surface is formed on an outer portion of the vehicle body 12 in the width direction of the vehicle by the door outer panel 32A and the front fender 14.

One end of the door hinge 120 is fastened to the door inner panel 32B and a hinge retainer 32C of the front side door 32 by a bolt 124A and a nut 124B. Further, the other end of the door hinge 120 is fastened to the front pillar RF 52 of the front pillar 50 by a bolt 122A and a nut 122B. As described above, the front side door 32 is supported by the door hinge 120 so as to be rotatable with respect to the front pillar 50. That is, the front side door 32 is adapted to be capable of opening the front side door opening portion 22.

(Center Pillar)

FIG. 5 is a cross-sectional view of a portion around the center pillar 60 (a cross-sectional view taken along line B-B of FIG. 1). As illustrated in FIG. 5, the center pillar 60 includes the center pillar RF 62 that is an outer portion of the center pillar 60 in the width direction of the vehicle, and a center pillar inner panel 64 that is an inner portion of the center pillar 60 in the width direction of the vehicle. The center pillar RF 62 has the shape of a hat that is opened inward in the width direction of the vehicle in a plan cross-sectional view, a flange 62A, which extends toward the front side of the vehicle, is formed at the front portion of the center pillar RF 62 in the front-rear direction of the vehicle, and a flange 62B, which extends toward the rear side of the vehicle, is formed at the rear portion of the center pillar RF 62 in the front-rear direction of the vehicle. Further, the center pillar inner panel 64 has the shape of a hat that is opened outward in the width direction of the vehicle in a plan cross-sectional view, a flange 64A, which extends toward the front side of the vehicle, is formed at the front portion of the center pillar inner panel 64 in the front-rear direction of the vehicle, and a flange 64B, which extends toward the rear side of the vehicle, is formed at the rear portion of the center pillar inner panel 64 in the front-rear direction of the vehicle. Furthermore, the flange 62A and the flange 64A are joined to each other by spot welding or the like, and the flange 62B and the flange 64B are joined to each other by spot welding or the like. Accordingly, the center pillar RF 62 and the center pillar inner panel 64 are joined to each other and the center pillar 60 having a closed cross-section 66 is formed.

The center pillar RF 62 of this embodiment forms the outermost surface of the center pillar 60 in the width direction of the vehicle. That is, the center pillar RF 62 is formed as a quasi-outer plate that is exposed to the outside 112 of the vehicle when the front side door 32 and the rear side door 34 are opened.

The door opening trim 58, which continues from the front pillar 50, is provided on the flanges 62A and 64A that are the front end portion of the center pillar 60 in the front-rear direction of the vehicle. The hollow seal portion 58A of the door opening trim 58 is in contact with the door inner panel 32B in a state where the hollow seal portion 58A is elastically deformed. Further, the door opening trim 78 is provided on the flanges 62B and 64B that are the rear end portion of the center pillar 60 in the front-rear direction of the vehicle. The door opening trim 78 includes a hollow seal portion 78A that is bulged outward in the width direction of the vehicle and has a hollow cross-section. The hollow seal portion 78A is in contact with a door inner panel 34B to be described later in a state where the hollow seal portion 78A is elastically deformed.

The rear side door 34 is supported on the outer surface of the center pillar RF 62 in the width direction of the vehicle through a door hinge (not illustrated) so as to be openable and closable. Here, the rear side door 34 includes a door outer panel 34A that is made of metal and substantially has the shape of a flat plate in a plan cross-sectional view, and the door inner panel 34B that is made of metal and substantially has the shape of a hat. Further, although not illustrated, a reveal, which supports a side door glass so as to allow the side door glass to be slidable, is joined to an upper portion of the door inner panel 34B of the rear side door 34 of this embodiment in the up-down direction of the vehicle.

A continuous design surface is formed on the outer side of the center pillar 60 in the width direction of the vehicle by the door outer panel 32A of the front side door 32 and the door outer panel 34A of the rear side door 34.

Further, the weather strip 44 made of rubber is provided on the door inner panel 34B of the rear side door 34 so as to surround the outer peripheral portion of the rear side door 34. The weather strip 44 includes a hollow seal portion 44A that is bulged toward the rear side door opening portion 24 and has a hollow cross-section. The hollow seal portion 44A is in contact with the second intermediate contact surface 62D, which forms the contact surface 24A, in a state where the hollow seal portion 44A is elastically deformed. Meanwhile, the hollow seal portion 42A of the weather strip 42 is in contact with the first intermediate contact surface 62C, which forms the contact surface 22A, of the center pillar RF 62 in a state where the hollow seal portion 42A is elastically deformed.

Here, a latch mechanism (not illustrated) is provided on the rear side of the front side door 32 in the front-rear direction of the vehicle. When the latch mechanism is engaged with a striker (not illustrated) that is provided on the center pillar 60, the front side door 32 is in a closed state. When the front side door 32 is in a closed state, the hollow seal portion 58A of the door opening trim 58 is in contact with the door inner panel 32B. Further, the hollow seal portion 42A of the weather strip 42 is in contact with the contact surface 22A. Accordingly, since a gap between the front side door opening portion 22 and the front side door 32 is closed in the closed state of the front side door 32, the airtightness of the inside 110 of the vehicle is maintained.

Furthermore, a latch mechanism (not illustrated) is provided on the rear side of the rear side door 34 in the front-rear direction of the vehicle. When the latch mechanism is engaged with a striker (not illustrated) that is provided on the rear pillar 70, the rear side door 34 is in a closed state. When the rear side door 34 is in a closed state, the hollow seal portion 78A of the door opening trim 78 is in contact with the door inner panel 34B. Further, the hollow seal portion 44A of the weather strip 44 is in contact with the contact surface 24A. Accordingly, since a gap between the rear side door opening portion 24 and the rear side door 34 is closed in the closed state of the rear side door 34, the airtightness of the inside 110 of the vehicle is maintained.

(Roof Side Rail)

Figure 6:
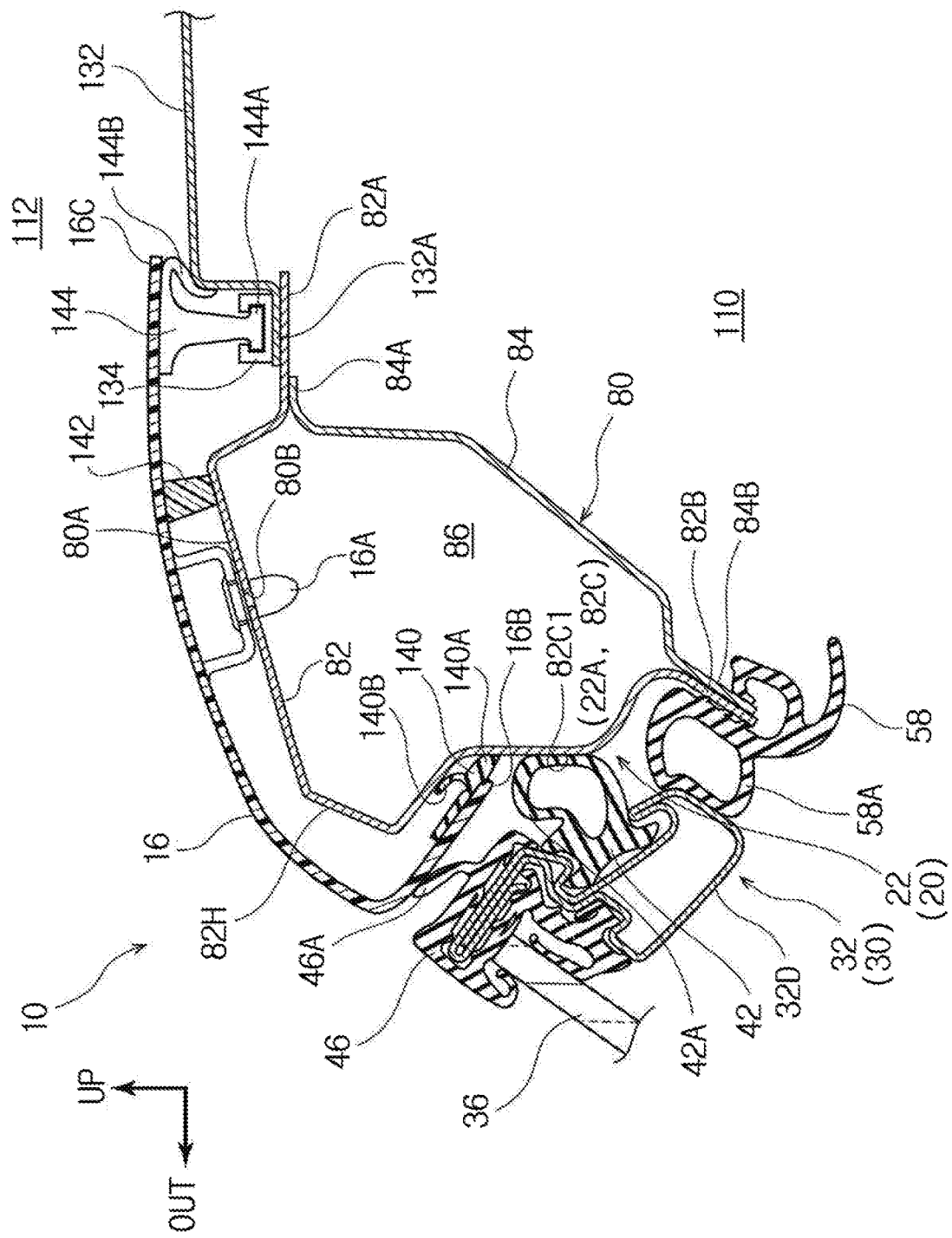
FIG. 6 is a cross-sectional view of a portion of the vehicle side portion structure according to the embodiment around a roof side rail (a cross-sectional view taken along line C-C of FIG. 1)

FIG. 6 is a cross-sectional view of the roof side rail 80 (a cross-sectional view taken along line C-C of FIG. 1). As illustrated in FIG. 6, the roof side rail 80 includes the rail RF 82 that is disposed on the upper side of the vehicle and the outer side in the width direction of the vehicle and a rail inner panel 84 that is disposed on the lower side of the vehicle and the inner side in the width direction of the vehicle. The rail RF 82 has the shape of a deep hat that is opened inward in the width direction of the vehicle and downward in the up-down direction of the vehicle in a cross-sectional view, a flange 82A, which extends inward in the width direction of the vehicle, is formed at the inner portion of the rail RF 82 in the width direction of the vehicle, and a flange 82B, which extends toward the lower side of the vehicle, is formed at a lower portion of the rail RF 82 in the up-down direction of the vehicle. Further, the rail inner panel 84 has the shape of a shallow hat in a cross-sectional view, a flange 84A, which extends inward in the width direction of the vehicle, is formed at the inner portion of the rail inner panel 84 in the width direction of the vehicle, and a flange 84B, which extends toward the lower side of the vehicle, is formed at a lower portion of the rail inner panel 84 in the up-down direction of the vehicle. Furthermore, the flange 82A and the flange 84A are joined to each other by spot welding or the like, and the flange 82B and the flange 84B are joined to each other by spot welding or the like. Accordingly, the rail RF 82 and the rail inner panel 84 are joined to each other and the roof side rail 80 having a closed cross-section 86 is formed.

Meanwhile, on the inner side of the roof side rail 80 in the width direction of the vehicle, a flange 132A, which is formed at an outer portion of the roof panel 132 in the width direction of the vehicle, is joined together with the flanges 82A and 84A by spot welding or the like.

The upper contact surface 82C, which extends substantially in the up-down direction of the vehicle and with which the hollow seal portion 42A of the weather strip 42 is to come into contact, is provided at the outer portion of the roof side rail 80, which has the above-mentioned structure, in the width direction of the vehicle. Further, a protruding portion 82H, which protrudes outward from the upper contact surface 82C in the width direction of the vehicle, is formed on the upper side of the upper contact surface 82C in the up-down direction of the vehicle and on the outer side than the flange 82B in the width direction of the vehicle. The protruding portion 82H is a portion that is bulged most, of the hat-shaped rail RF 82.

Figure 7:
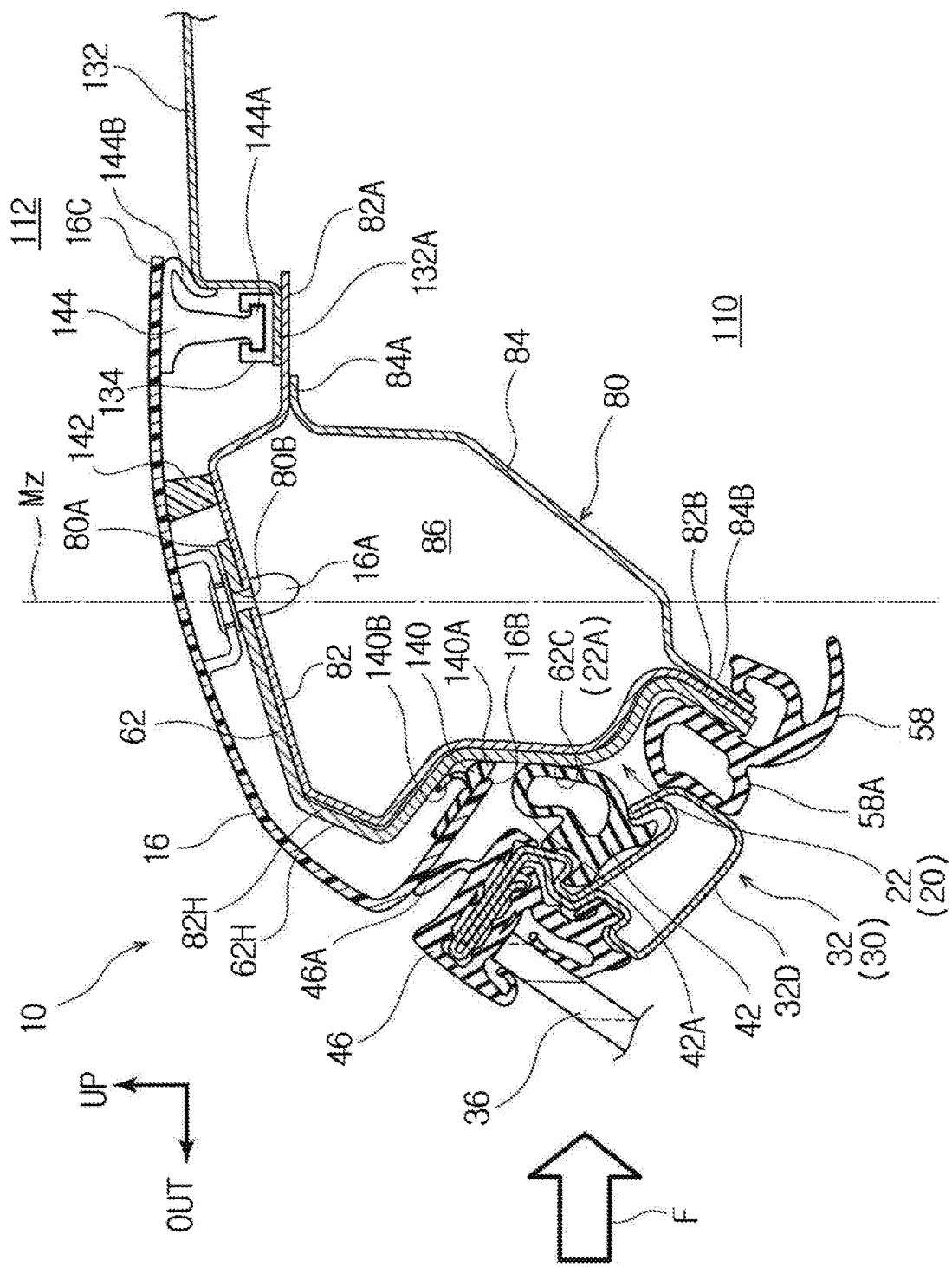
FIG. 7 is a cross-sectional view of a portion of the vehicle side portion structure according to the embodiment around the roof side rail (a cross-sectional view taken along line D-D of FIG. 1)

Further, the upper portion of the center pillar RF 62 in the up-down direction of the vehicle is joined to the rail RF 82 by welding or the like as described above at the joint of the roof side rail 80 that is joined to the center pillar 60. FIG. 7 is a cross-sectional view of the roof side rail 80 including the center pillar RF 62 (a cross-sectional view taken along line D-D of FIG. 1). As illustrated in FIG. 7, the upper end portion of the center pillar RF 62 in the up-down direction of the vehicle has a shape corresponding to the rail RF 82. For this reason, the center pillar RF 62 includes a protruding portion 62H at a position corresponding to the protruding portion 82H of the rail RF 82.

Furthermore, the first intermediate contact surface 62C functions as a portion, which is to come into contact with the weather strip 42, instead of the first upper contact surface 82C1 at the joint of the roof side rail 80 that is joined to the center pillar RF 62. In addition, the second intermediate contact surface 62D functions as a portion, which is to come into contact with the weather strip 42, instead of the second upper contact surface 82C2.

Meanwhile, as illustrated in FIGS. 6 and 7, the rail garnish 16, which has a substantially C shape in a cross-sectional view, is fixed to the upper portion of the roof side rail 80 in the up-down direction of the vehicle. The rail garnish 16 includes a clip 16A that is provided substantially in the middle of the rail garnish 16 in the width direction of the vehicle and protrudes toward the lower side of the vehicle. Further, the rail garnish 16 includes a fixing member 144 that is provided at the inner portion of the rail garnish in the width direction of the vehicle and protrudes toward the lower side of the vehicle. Meanwhile, a mounting hole 80B is formed in an upper wall surface 80A of the roof side rail 80 at a position corresponding to the clip 16A. Furthermore, a box-like clip 134 of which the upper side in the up-down direction of the vehicle is opened is provided on the upper surface of the flange 132A at a position corresponding to the fixing member 144. Further, when the clip 16A is fitted to the mounting hole 80B and a wide portion 144A, which is formed at the tip of the fixing member 144, is fitted to the clip 134, the rail garnish 16 is fixed.

Figure 8:
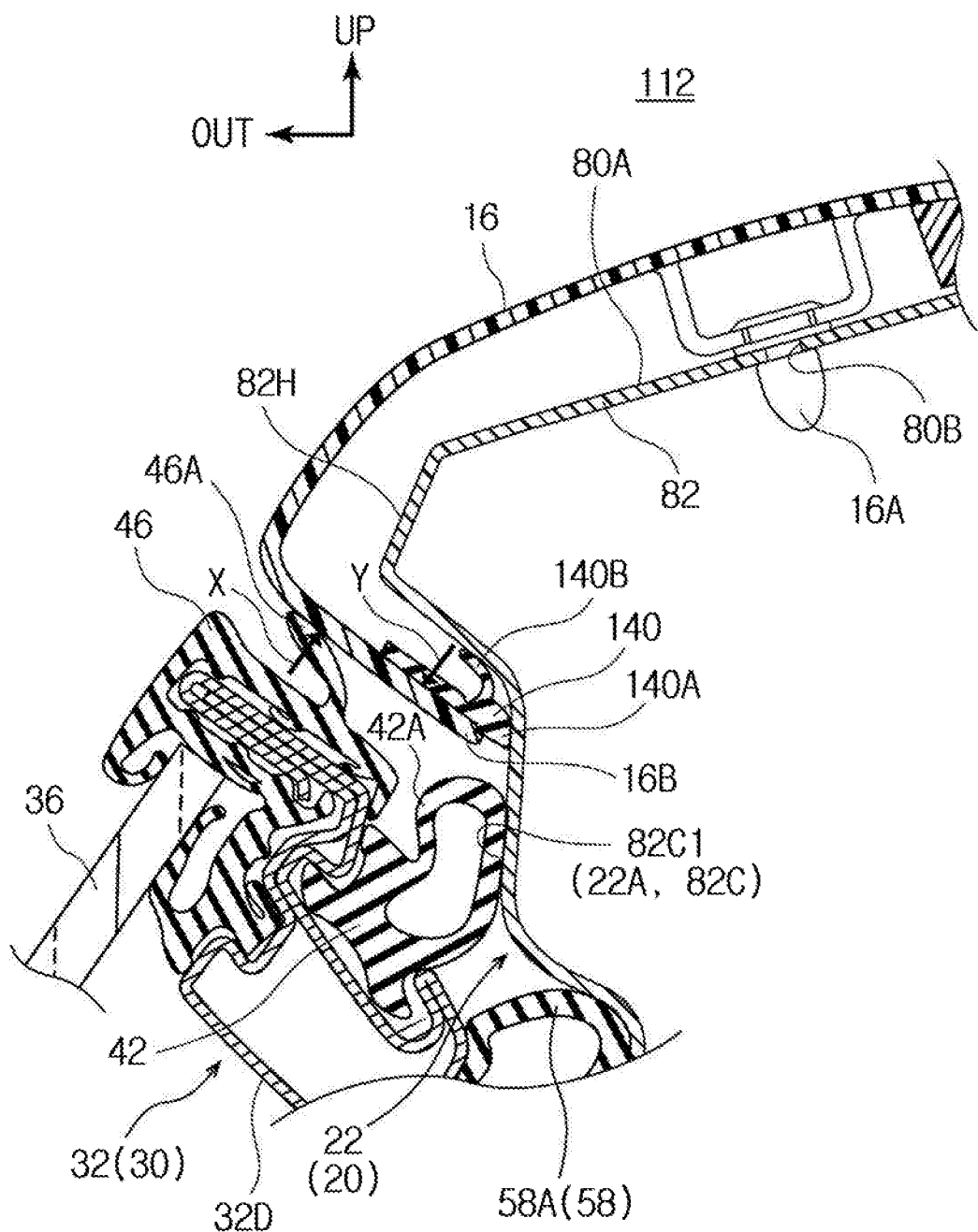
FIG. 8 is an enlarged view of a portion of the vehicle side portion structure according to the embodiment near an end portion of a rail garnish close to the lower side of the vehicle (an enlarged view of FIG. 6)

Here, as illustrated in FIGS. 6 and 8, a terminal member 140, which is an elastic member, is provided at an end portion 16B of the rail garnish 16 close to the lower side of the vehicle. The terminal member 140 is made of rubber, and is bonded to the back surface of the rail garnish 16 by a double-sided tape or the like. Further, the terminal member 140 includes a tip portion 140A that is provided at an inner end portion of the terminal member 140 in the width direction of the vehicle. Furthermore, the terminal member 140 includes a lip portion 140B. The lip portion 140B is formed toward the upper side of the vehicle from a portion of the tip portion 140A, which is an outer portion of the tip portion 140A in the width direction of the vehicle and an upper portion thereof in the up-down direction of the vehicle, and has a cross-sectional shape that is the shape of a tongue piece.

In a state where the rail garnish 16 is fixed to the roof side rail 80, the states of the tip portion 140A and the lip portion 140B are as follows. That is, on the front side of the center pillar RF 62 in the front-rear direction of the vehicle, the tip portion 140A is in contact with the first upper contact surface 82C1 and the tip portion of the lip portion 140B is in contact with the surface of the protruding portion 82H close to the end (close to the first upper contact surface 82C1) in a state where the tip portion of the lip portion 140B is elastically deformed. Further, as illustrated in FIG. 7, at the front portion of the center pillar RF 62 in the front-rear direction of the vehicle, the tip portion 140A is in contact with the first intermediate contact surface 62C and the tip portion of the lip portion 140B is in contact with the surface of the protruding portion 62H close to the end (close to the first intermediate contact surface 62C) in a state where the tip portion of the lip portion 140B is elastically deformed. Furthermore, although not illustrated, at the rear portion of the center pillar RF 62 in the front-rear direction of the vehicle, the tip portion 140A is in contact with the second intermediate contact surface 62D and the tip portion of the lip portion 140B is in contact with the surface of the protruding portion 62H close to the end (close to the second intermediate contact surface 62D) in a state where the tip portion of the lip portion 140B is elastically deformed. In addition, on the rear side of the center pillar RF 62 in the front-rear direction of the vehicle, the tip portion 140A is in contact with the second upper contact surface 82C2 and the tip portion of the lip portion 140B is in contact with the surface of the protruding portion 82H close to the end (close to the second upper contact surface 82C2) in a state where the tip portion of the lip portion 140B is elastically deformed.

As illustrated in FIGS. 6 and 7, a spacer 142, which is provided between the clip 16A and the fixing member 144 in the width direction of the vehicle and is made of an elastic resin, is in contact with the upper surface of the rail RF 82 in a state where the rail garnish 16 is fixed to the roof side rail 80. In addition, at an inner end portion 16C of the rail garnish 16 in the width direction of the vehicle, a lip portion 144B, which extends from the inner end portion of the fixing member 144 in the width direction of the vehicle and of which the cross-sectional shape is the shape of a tongue piece, is in contact with the roof panel 132 in a state where the lip portion 144B is elastically deformed.

As described above, the rail garnish 16 is subjected to a pressing force, which acts in a direction where the rail garnish 16 floats from the roof side rail 80, from the lip portion 140B of the terminal member 140, the spacer 142, and the lip portion 144B of the fixing member 144 in a state where the rail garnish 16 is fixed. Accordingly, rattling, which may occur when the rail garnish 16 is fixed, is suppressed.

When the rail garnish 16 is fixed to the roof side rail 80, the range of the roof side rail 80 between the protruding portion 82H (or the protruding portion 62H) and the flange 82A is covered with the rail garnish 16. Further, the fixed portion (flange 132A) of the roof panel 132 is shielded by the rail garnish 16.

The door opening trim 58 is provided on the flange 82B and the flange 84B (also including the center pillar RF 62 in the case of the joint of the roof side rail 80 joined to the center pillar 60) that are the lower end portion of the roof side rail 80 in the up-down direction of the vehicle. The door opening trim 58 is a trim that is formed so as to continue from the front pillar 50 and the center pillar 60.

As described above, the front side door 32 is supported on the front pillar 50 through the door hinge 120 so as to be openable and closable. Here, the front side door 32 includes the reveal 32D, which supports the side door glass 36 so as to allow the side door glass 36 to be slidable. The reveal 32D is provided with a glass run 46 that guides the upward and downward movement of the side door glass 36 in the up-down direction of the vehicle. In addition, the weather strip 42 is provided on the reveal 32D so as to surround the outer peripheral portion of the front side door 32. Specifically, the weather strip 42 is provided so as to continue over the reveal 32D from the door inner panel 32B.

Since a gap between the front side door opening portion 22 and the front side door 32 is closed in the closed state of the front side door 32 by the door opening trim 58 and the weather strip 42 as described above, the airtightness of the inside 110 of the vehicle is maintained.

(Structure of Parting Portion)

FIG. 9 is a cross-sectional view of a portion around the parting portion 28A (a cross-sectional view taken along line E-E of FIG. 2). As illustrated in FIG. 9, the rail RF 82 includes a recessed portion 82D, which is provided at the joint of the center pillar RF 62 joined to the rail RF and is recessed inward in the width direction of the vehicle by the thickness of the center pillar RF 62. For this reason, the outer surface of the center pillar RF 62 in the width direction of the vehicle and the outer surface of the rail RF 82 in the width direction of the vehicle are present at substantially the same position in the width direction of the vehicle.

Here, a portion of the recessed portion 82D to which the center pillar RF 62 is not joined forms a stepped portion 82E at the parting portion 28A. The parting portion 28A including the stepped portion 82E forms a gap when the hollow seal portion 44A of the weather strip 44 is in contact with the contact surface. Since such a gap serves as a passage along which rain water or the like infiltrates to the inside 110 of the vehicle, the gap is not preferable. For this reason, the stepped portion 82E is filled with the seal material 150 as a filler, such that a surface continuing over the rail RF 82 from the center pillar RF 62 is formed at the parting portion 28A in this embodiment. Accordingly, since a flat and smooth contact surface 24A including the second intermediate contact surface 62D of the center pillar RF 62, the surface of the seal material 150, and the second upper contact surface 82C2 of the rail RF 82 is formed, the infiltration of rain water or the like to the inside 110 of the vehicle is suppressed.

The structure of the parting portion 28A has been described above. However, the stepped portions of the parting portions 26A and 26C are also filled with the seal material 150 in this embodiment, such that a flat and smooth contact surface 22A is formed at each of the parting portions 26A and 26C. Further, the stepped portions of the parting portions 28C and 28E are also filled with the seal material 150, such that a flat and smooth contact surface 24A is formed at each of the parting portions 28C and 28E.

Meanwhile, the stepped portion 82E has been filled with the seal material 150 in this embodiment, but the filler is not limited thereto and a brazing material may be filled as the filler.

(Modification of Parting Portion)

Figure 10:
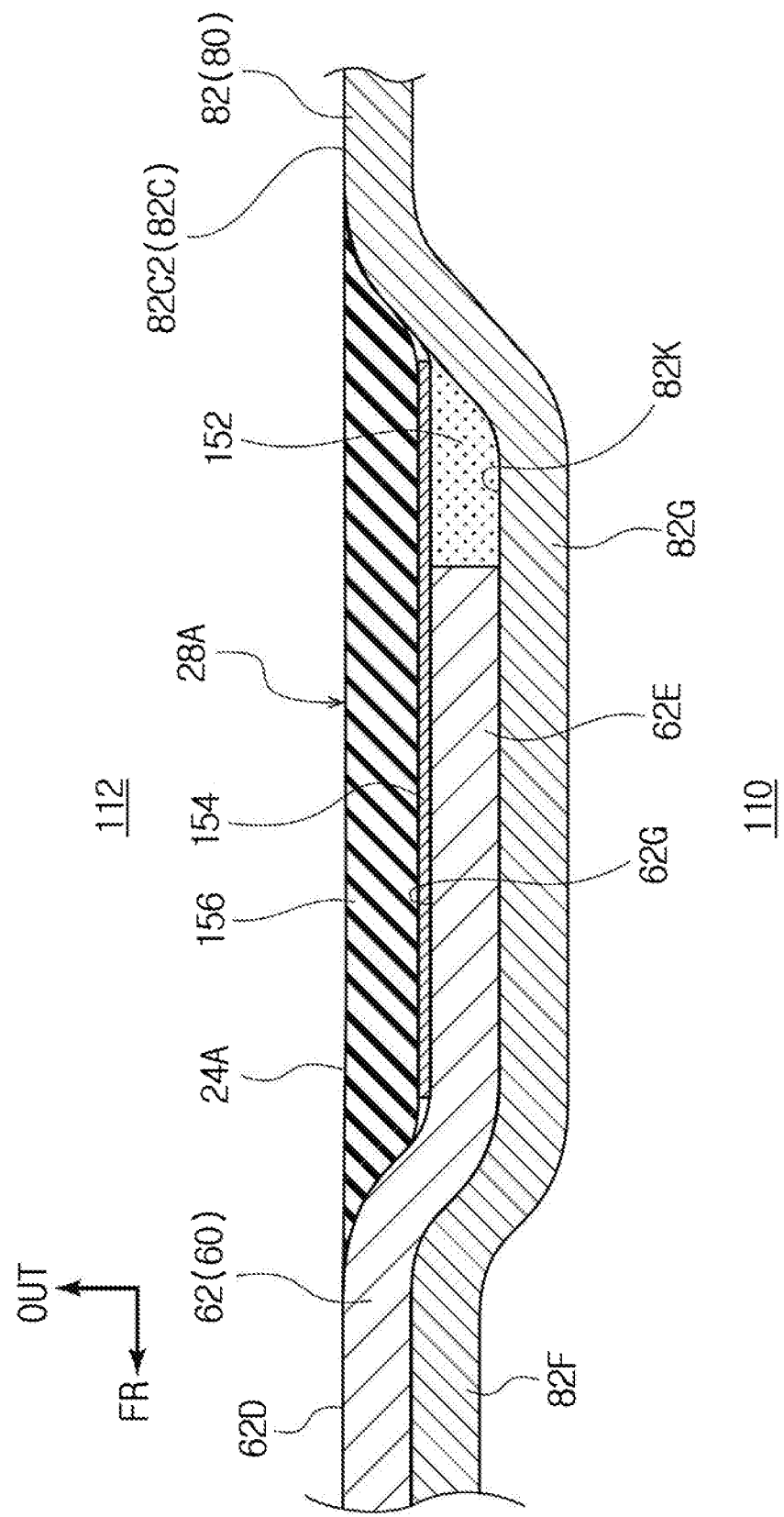
FIG. 10 is a cross-sectional view of a parting portion of a vehicle side portion structure according to a modification (a view corresponding to the cross-sectional view taken along line E-E of FIG. 2).

FIG. 10 is a cross-sectional view of a portion around a parting portion 28A of a modification of this embodiment (a view corresponding to the cross-sectional view taken along line E-E of FIG. 2). As illustrated in FIG. 10, in this modification, the rail RF 82 includes a first recessed portion 82F that is provided at a portion, which is positioned on the front side of the parting portion 28A in the front-rear direction of the vehicle, of a joint of the center pillar RF 62 joined to the rail RF 82 and is recessed inward in the width direction of the vehicle by the thickness of the center pillar RF 62. For this reason, the outer surface of the center pillar RF 62 in the width direction of the vehicle excluding the parting portion 28A and the outer surface of the rail RF 82 in the width direction of the vehicle are present at substantially the same position in the width direction of the vehicle.

Further, the rail RF 82 includes a second recessed portion 82G that is provided at the parting portion 28A of the joint of the center pillar RF 62 joined to the rail RF 82 and is recessed inward in the width direction of the vehicle by a distance equal to or larger than the thickness of the center pillar RF 62. Meanwhile, the center pillar RF 62 includes a receding portion 62E that is provided at the parting portion 28A, is an end portion thereof in the front-rear direction of the vehicle, and has the same recessed distance as the recessed distance of the second recessed portion 82G recessed from the first recessed portion 82F.

In this modification, the receding portion 62E of the center pillar RF 62 overlaps the second recessed portion 82G of the rail RF 82 when the center pillar RF 62 is joined to the rail RF 82. Accordingly, a portion of the second recessed portion 82G to which the center pillar RF 62 is not joined forms a stepped portion 82K at the parting portion 28A. Here, the stepped portion 82K is filled with a seal material 152, so that a bonding surface 62G continuing from the receding portion 62E of the center pillar RF 62 is formed at the parting portion 28A in this modification.

In addition, a rubber sheet 156 as a cover member is attached to the bonding surface 62G with a double-sided tape 154 in this modification. Accordingly, a surface continuing over the rail RF 82 from the center pillar RF 62 is formed at the parting portion 28A.

In the embodiment, there is a case where a gap is formed between the contact surface 24A and the weather strip 44 when a sink mark occurs due to drying after the stepped portion is filled with the seal material 150. Further, in a case where a brazing material is used, grinding needs to be performed when the amount of the brazing material to be supplied is large. In contrast, according to this modification, a rubber sheet 156 is used for the outermost surface instead of a seal material that is likely to cause a sink mark and a brazing material that needs to be subjected to grinding. Accordingly, since a flat and smooth contact surface 24A including the second intermediate contact surface 62D of the center pillar RF 62, the surface of the rubber sheet 156, and the second upper contact surface 82C2 of the rail RF 82 is formed, the infiltration of rain water or the like to the inside 110 of the vehicle is suppressed.

Meanwhile, the stepped portion 82K may be filled with a brazing material instead of the seal material 152.

(Conclusion)

The vehicle side portion structure 10 of this embodiment has characteristics in terms of a plurality of structures. Structural characteristics and effects obtained from the characteristics will be described below.

In the vehicle side portion structure 10 of this embodiment, the outer portion of the roof side rail 80, which has a closed cross-section 86, in the width direction of the vehicle is formed of the rail RF 82. Here, in regard to the front side door opening portion 22, the rail RF 82 includes the first upper contact surface 82C1 with which the weather strip 42 provided on the outer peripheral portion of the front side door 32 is to come into contact, and the flange 82A to which the roof panel 132 is joined. Further, in regard to the rear side door opening portion 24, the rail RF 82 includes the second upper contact surface 82C2 with which the weather strip 44 provided on the outer peripheral portion of the rear side door 34 is to come into contact, and the flange 82A to which the roof panel 132 is joined. Furthermore, the vehicle side portion structure 10 includes the rail garnish 16 that covers the upper portion of the roof side rail 80 in the up-down direction of the vehicle from the flange 82A to the upper portion of the upper contact surface 82C (the first upper contact surface 82C1 and the second upper contact surface 82C2) in the up-down direction of the vehicle.

That is, a first characteristic is that the rail RF 82 includes the upper contact surface 82C with which the weather strips 42 and 44 are to come into contact and the rail garnish 16 is mounted while avoiding the upper contact surface 82C.

According to the first characteristic, the first upper contact surface 82C1, which is provided so as to correspond to the front side door 32, and the second upper contact surface 82C2, which is provided so as to correspond to the rear side door 34, of the rail RF 82 are exposed to the outside and are not covered with the side member outer panel or the like. Accordingly, the rail RF 82 of this embodiment functions as a quasi-outer plate when each side door 30 is opened.

Further, the rail garnish 16 covering the roof side rail 80 is a member that is separate from the rail RF 82 functioning as a quasi-outer plate. For this reason, according to the first characteristic, the number of members used to cover a vehicle side portion is smaller than that in a case where the vehicle side portion includes a roof side rail and a side member outer panel covering a vehicle rear portion as in the related art disclosed in the above-mentioned Japanese Patent Application No. 2011-195108. Accordingly, the vehicle can be made light. In addition, since a side member outer panel covering a portion from a vehicle rear side portion to the roof side rail is not provided and the side member outer panel (quarter panel 19) covering only the vehicle rear portion is provided, the generation amount of scrap at the time when a blank for the side member outer panel is punched out of a steel plate, is reduced. Accordingly, a yield can be improved.

The vehicle side portion structure 10 of this embodiment further includes the pillar reinforcements (the front pillar RF 52 and the center pillar RF 62) that form the outer portions of the pillars (the front pillar 50 and the center pillar 60) in the width direction of the vehicle and are connected to the rail RF 82. Here, a second characteristic is that the front pillar RF 52 includes the front contact surface 52C with which the weather strip 42 is to come into contact and the center pillar RF 62 includes the first intermediate contact surface 62C with which the weather strip 42 is to come into contact and the second intermediate contact surface 62D with which the weather strip 44 is to come into contact.

In the vehicle side portion structure 10 of this embodiment, the front contact surface 52C of the front pillar RF 52 is exposed to the outside and the first intermediate contact surface 62C and the second intermediate contact surface 62D of the center pillar RF 62 are exposed to the outside. That is, the front pillar 50 and the center pillar 60 are not covered with the side member outer panel or the like. Accordingly, according to the second characteristic, each of the front pillar RF 52 and the center pillar RF 62 functions as a quasi-outer plate when each side door 30 is opened.

Here, the comparison of the cross-sectional structure of a center pillar 160 in the related art and the cross-sectional structure of the center pillar 60, which is performed using FIG. 5, is as follows. For example, in a case where the side member outer panel is disposed on the center pillar 160 in the related art at the same position as the position of the center pillar RF 62 of this embodiment as illustrated by a two-dot chain line of FIG. 5, a center pillar reinforcement 162 is disposed on the inner side than the center pillar RF 62 in the width direction of the vehicle. In other words, since a side member outer panel covering the pillar is not provided in this embodiment, the area of a hollow portion of the closed cross-section 66 can be increased as much as that. That is, according to the second characteristic, the cross-sectional strength and stiffness of the pillar can be improved. Further, since the thickness of the pillar reinforcement or the like of the pillar can be reduced as much as the stiffness of the pillar that can be ensured by an increase in the area of the hollow portion of the closed cross-section 66, the vehicle can be made light.

Furthermore, the vehicle side portion structure 10 of this embodiment includes the parting portion that is an outer portion of a connecting portion between each pillar reinforcement and the rail RF 82 in the width direction of the vehicle. Specifically, as illustrated in FIG. 1, the parting portion 26A is provided at a connecting portion between the front pillar RF 52 and the rail RF and the parting portion 26C and the parting portion 28A are provided at a connecting portion between the center pillar RF 62 and the rail RF 82. Further, the parting portion 28C is provided at a connecting portion between the rear pillar RF 72 and the rail RF 82. Meanwhile, the parting portion 28E is present at the joint between the rear pillar RF 72 and the quarter panel 19.

Further, the parting portion 26A is filled with the seal material 150 as a filler such that the continuous contact surface 22A is formed over the rail RF 82 from the front pillar RF 52. Likewise, the parting portion 26C is filled with the seal material 150 such that the continuous contact surface 22A is formed over the rail RF 82 from the center pillar RF 62, and the parting portion 28A is filled with the seal material 150 such that the continuous contact surface 24A is formed. Furthermore, the parting portion 28C is filled with the seal material 150 such that the continuous contact surface 24A is formed over the rail RF 82 from the rear pillar RF 72. In addition, the parting portion 28E is filled with the seal material 150 such that the continuous contact surface 24A is formed over the quarter panel 19 from the rear pillar RF 72.

A third characteristic is that the parting portions 26A and 26C and the parting portions 28A, 28C, and 28E present on the roof side rail 80 are filled with the seal material 150 as a filler as described above.

According to the third characteristic, a step, which is formed at the parting portion between the rail reinforcement functioning as a quasi-outer plate and the pillar reinforcement functioning as a quasi-outer plate or the quarter panel functioning as an outer plate, is filled with a filler, so that the infiltration of rain water or the like into the parting portion can be suppressed.

Particularly, when a parting portion is present on a door opening portion in the related art, the contact surface for a weather strip has needed to be provided on the side door as a main seal surface. In this case, when a press door is used as a side door, a significant change in the structure of a door, such as the removal of the parting of the side door, has been needed. In contrast, this embodiment can also be applied to any type door, such as a frame door or a press door, without a change in a basic structure.

Meanwhile, in this embodiment, the parting portions 26A, 26C, 28A, 28C, and 28E, which are provided at the upper portion of the door opening portion 20 in the up-down direction of the vehicle, are filled with the seal material 150 so that the infiltration of rain water or the like is suppressed. However, the disclosure is not limited to this embodiment. For example, the parting portions 26B, 26D, 28B, and 28D, which are provided at the lower portion of the door opening portion 20 in the up-down direction of the vehicle, are filled with the seal material, so that the infiltration of water or the like splashed from a road surface can be suppressed. However, the parting portions 26B, 26D, 28B, and 28D, which are provided at the lower portion of the door opening portion in the up-down direction of the vehicle, can also be made to function as a discharge passage when water infiltrates in the side door 30. For this reason, only a part of the parting portions 26B, 26D, 28B, and 28D may be filled with the seal material.

Further, in regard to the parting portion of the modification of this embodiment, the parting portion 26A is provided with the rubber sheet 156 as a cover member such that the continuous contact surface 22A is formed over the rail RF 82 from the front pillar RF 52. Likewise, the parting portion 26C is provided with the rubber sheet 156 as a cover member such that the continuous contact surface 22A is formed over the rail RF 82 from the center pillar RF 62, and the parting portion 28A is provided with the rubber sheet 156 such that the continuous contact surface 24A is formed over the rail RF 82 from the center pillar RF 62. Furthermore, the parting portion 28C is provided with the rubber sheet 156 such that the continuous contact surface 24A is formed over the rail RF 82 from the rear pillar RF 72. In addition, the parting portion 28E is provided with the rubber sheet 156 such that the continuous contact surface 24A is formed over the quarter panel 19 from the rear pillar RF 72.

A fourth characteristic is that each of the parting portions 26A and 26C and the parting portions 28A, 28C, and 28E present on the roof side rail 80 is provided with the rubber sheet 156, which is a cover member, as described above.

According to the fourth characteristic, a step, which is formed at the parting portion between the rail reinforcement functioning as a quasi-outer plate and the pillar reinforcement functioning as a quasi-outer plate or the quarter panel functioning as an outer plate, is covered with a cover member, so that the infiltration of rain water or the like into the parting portion can be suppressed. Further, as in the case of the effect of the third characteristic, the modification having the fourth characteristic can also be applied to any type door, such as a frame door or a press door, without a change in a basic structure.

In addition, since each of the parting portions 26B, 26D, 28B, and 28D, which are provided at the lower portion of the door opening portion 20 in the up-down direction of the vehicle, is provided with a cover member, the infiltration of water or the like splashed from a road surface can be suppressed as in a case where the parting portion is filled with a filler.

The vehicle side portion structure 10 of this embodiment includes the parting portion 26A as a front parting portion that is an outer portion of the connecting portion between the front pillar RF 52 of the front pillar 50 and the rail RF 82 in the width direction of the vehicle. A fifth characteristic is that the parting portion 26A is provided so as to be exposed to the outside from the front fender 14 as illustrated in FIG. 3.

In the vehicle side portion structure 10 of this embodiment, the parting portion 26A, which is formed at the connecting portion between the front pillar RF 52 and the rail RF 82, is not hidden by the front fender 14. Accordingly, according to the fifth characteristic, a seal material can be applied to the parting portion 26A even after the front fender 14 is mounted on the front pillar 50 and the roof side rail 80 serving as vehicle body frames.

A sixth characteristic is that the rail garnish 16 of this embodiment is made of a resin.

According to the sixth characteristic, a portion corresponding to the roof side rail 80 can be made lighter than that in a case where the rail garnish 16 is made of metal. Further, only the portion corresponding to the roof side rail 80 can be set to a shape and a color having high designability. In addition, since the rail garnish 16 made of a resin can be attached and detached using a clip or the like, the rail garnish 16 can be easily replaced.

A seventh characteristic is that the roof side rail 80 includes the protruding portions 62H and 82H protruding outward from the contact surface 22A in the width direction of the vehicle in a cross-sectional view. Specifically, the rail RF 82 includes the protruding portion 82H that protrudes outward from the upper contact surface 82C in the width direction of the vehicle (see FIG. 6), and the center pillar RF 62 includes the protruding portion 62H that protrudes outward from the first intermediate contact surface 62C or the second intermediate contact surface 62D in the width direction of the vehicle (see FIG. 7).

According to the seventh characteristic, since the protruding portions 62H and 82H are disposed at positions most distant from a neutral axis Mz of bending moment at the time of lateral collision of a vehicle 12 as illustrated in FIG. 7, yield strength can be efficiently improved. Further since the protruding portion 82H is disposed at, for example, a position closest to a load F that is input from the outer side in the width direction of the vehicle through the center pillar 60 at the time of lateral collision, an effect of suppressing the compressive deformation of a cross-section is obtained.

An eighth characteristic is that the terminal member 140, which is in contact with the protruding portions 62H and 82H and the contact surfaces 22A and 24A, is provided at the end portion 16B of the rail garnish 16 close to the lower side of the vehicle. As illustrated in, for example, FIG. 6, the tip portion 140A is in contact with the first upper contact surface 82C1 and the tip portion of the lip portion 140B is in contact with the surface of the protruding portion 82H close to the end. Further, as illustrated in, for example, FIG. 7, the tip portion 140A is in contact with the first intermediate contact surface 62C and the tip portion of the lip portion 140B is in contact with the surface of the protruding portion 62H close to the end.

According to the eighth characteristic, since the terminal member 140 is in contact with the roof side rail 80 at a plurality of portions while being subjected to an elastic force, the position variation of the end portion 16B of the rail garnish 16 is suppressed.

In detail, as illustrated in FIG. 8, the surface of the rail garnish 16 facing the glass run 46 is pressed from the lip portion 46A, which extends from the glass run 46, in the direction of an arrow X in the closed state of the front side door 32. Meanwhile, since the lip portion 140B of the terminal member 140 presses the rail RF 82 (the center pillar RF 62 in FIG. 8), the rail garnish 16 is relatively subjected to a reaction force in the direction of an arrow Y. Since a portion of the rail garnish 16 near the end portion 16B is subjected to two opposite forces as described above, the position variation of the end portion 16B is suppressed.

Further, the tip portion 140A of the terminal member 140 is in contact with the rail RF 82 (the center pillar RF 62 in FIG. 8) in this embodiment. For this reason, for example, when a user washes a vehicle, a reaction force can be generated from the rail garnish 16 even in a case where the user lays a hand on the rail garnish 16 so that a force is input from the outer side in the width direction of the vehicle. For example, there is a possibility that a dent may be formed due to the input of a certain force in the case of a rail garnish made of metal. However, according to the eighth characteristic, since a load input to the rail garnish 16 can be absorbed by the terminal member 140 that is an elastic member, the formation of the dent is suppressed.

Other characteristics are that a side member outer panel widely covering the vehicle side portion is not provided and the vehicle side portion is split into the front fender 14, the pillar garnish 15, the rail garnish 16, the quarter garnish 17, the rocker molding 18, and the quarter panel 19. Accordingly, the degree of freedom in the design, that is, the shape and color of each part can be increased. Further, the material of each panel can be freely selected according to strength or formability that should be ensured.

One embodiment of the disclosure has been described above, but the disclosure is not limited thereto. It is natural that the disclosure may have various modifications in addition to the embodiment without departing from the scope of the disclosure.

What is claimed is:

1. A vehicle side portion structure comprising:
    a roof side rail that includes a rail reinforcement that is an outer portion of the roof side rail in a width direction of a vehicle, the roof side rail having a closed cross-section structure;
    a first contact surface which is formed on the rail reinforcement and with which a weather strip provided on an outer peripheral portion of a rear side door of the vehicle is to come into contact;
    a flange which is formed at the rail reinforcement and to which a roof panel is joined;
    a rail garnish that covers a portion of the roof side rail from the flange to an upper portion of the first contact surface in an up-down direction of the vehicle;
    a rocker molding that covers a rocker of the vehicle;
    a rear quarter panel that covers a rear side portion of the vehicle; and
    a quarter garnish disposed between the rail garnish and the rear quarter panel, wherein
    the rail garnish, the rocker molding, the rear quarter panel and the quarter garnish are independent separate pieces, and
    the rail garnish, the rocker molding, the rear quarter panel and the quarter garnish cover a portion of a peripheral edge of a rear side door opening of the vehicle, the rear side door opening being closed by the rear side door.

2. The vehicle side portion structure according to claim 1, further comprising a pillar reinforcement that is an outer portion of a pillar in the width direction of the vehicle and is joined to the rail reinforcement in a state where the pillar reinforcement is overlapped with the rail reinforcement, wherein the pillar reinforcement includes a second contact surface with which the weather strip is to come into contact.

3. The vehicle side portion structure according to claim 2, wherein:
    a connecting portion between the pillar reinforcement and the rail reinforcement includes a parting portion that is an outer portion of the connecting portion in the width direction of the vehicle; and
    the parting portion is filled with a filler that forms a surface continuing over the rail reinforcement from the pillar reinforcement.

4. The vehicle side portion structure according to claim 2, wherein:
    a connecting portion between the pillar reinforcement and the rail reinforcement includes a parting portion that is an outer portion of the connecting portion in the width direction of the vehicle; and
    the parting portion is provided with a cover member that forms a surface continuing over the rail reinforcement from the pillar reinforcement.

5. The vehicle side portion structure according to claim 2, wherein:
    a connecting portion of a front pillar between the pillar reinforcement and the rail reinforcement includes a front parting portion that is an outer portion of the connecting portion in the width direction of the vehicle; and
    the front parting portion is provided so as to be exposed to an outside of a front fender.

6. The vehicle side portion structure according to claim 1, wherein the rail garnish is made of a resin.

7. The vehicle side portion structure according to claim 1, wherein the roof side rail includes a protruding portion that protrudes outward from the first contact surface in the width direction of the vehicle.

8. The vehicle side portion structure according to claim 7, wherein a lower end portion of the rail garnish in the up-down direction of the vehicle is provided with an elastic member that is in contact with the protruding portion and the first contact surface.

* * * * *